United States Patent [19]

Lebedev et al.

[11] 3,909,917

[45] Oct. 7, 1975

[54] METHOD OF BRAZING REFRACTORY METALS AND COMPOUNDS BASED THEREON

[76] Inventors: Viktor Fedorovich Lebedev, Prospekt Mira, 110/2 kv. 328; Anatoly Petrovich Zaitsev, Ba. Mariinskaya ulitsa, 17; Pavel Fishelevich Kvin, Zemsky pereulok, 9, kb. 5; Viktor Mikhailovich Shuboderov, Yasny proezd. 30, korpus 2, kv. 49; Vladimir Grigorievich Piljus, Shmitovsky proezd, 12, kv. 50; Nina Nikodimovna Filimonova, Avangardnaya ulitsa 6, korpus 1, kv. 164; Svetlana Ivanovna Suslakova, ulitsa Bashova, 15, korpus 1, kv. 102, all of Moscow, U.S.S.R.

[22] Filed: Oct. 7, 1974

[21] Appl. No.: 512,611

Related U.S. Application Data

[63] Continuation of Ser. No. 387,034, Aug. 9, 1973, abandoned, which is a continuation-in-part of Ser. No. 330,191, Feb. 7, 1973, abandoned, which is a continuation of Ser. No. 67,791, Aug. 28, 1970, abandoned.

[52] U.S. Cl. .............. 228/216; 228/227; 228/252
[51] Int. Cl.² ........................................... B23K 1/04
[58] Field of Search .............. 29/501, 500, 491, 497

[56] References Cited
UNITED STATES PATENTS

| | | | |
|---|---|---|---|
| 2,125,324 | 8/1938 | Williams et al. | 29/491 X |
| 2,646,995 | 7/1953 | Thompson | 29/491 X |
| 3,015,885 | 1/1962 | McEven et al. | 29/497 X |
| 3,259,971 | 7/1966 | Gagola et al. | 29/501 X |
| 3,276,113 | 10/1966 | Metcalfe | 29/501 X |
| 3,475,811 | 11/1969 | Clarke et al. | 29/501 X |
| 3,514,842 | 6/1970 | Beuyukian et al. | 29/501 X |

*Primary Examiner*—James L. Jones, Jr.
*Assistant Examiner*—K. J. Ramsey
*Attorney, Agent, or Firm*—Holman & Stern

[57] ABSTRACT

The present invention relates to a method of brazing refractory metals, refractory alloys and compounds. The present invention is characterized in that a brazing filler is placed into a hermetically sealed envelope made of a material having a melting temperature higher than the temperature of brazing. The envelope is secured to both parts to be brazed by means of a diffusion welding effected at a temperature lower than the brazing temperature.

4 Claims, 1 Drawing Figure

U.S. Patent  Oct. 7,1975  3,909,917
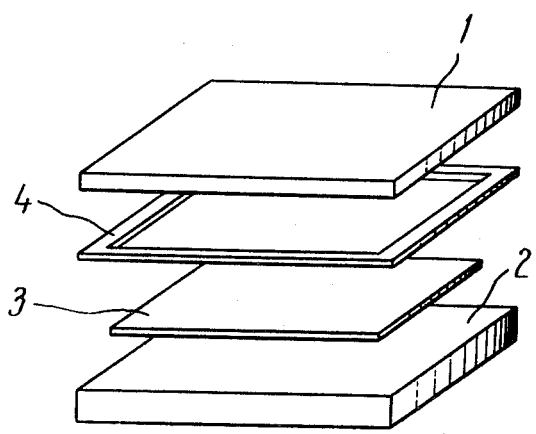

METHOD OF BRAZING REFRACTORY METALS AND COMPOUNDS BASED THEREON

CROSS-REFERENCE TO RELATED APPLICATIONS

This application is a continuation of application Ser. No. 387,034, filed Aug. 9, 1973, now abandoned, which in turn was a continuation-in-part of application Ser. No. 330,191 filed Feb. 7, 1973, now abandoned, which in turn was a continuation of application Ser. No. 67,791, filed Aug. 28, 1970, now abandoned.

BACKGROUND OF THE INVENTION

The present invention relates to a method of brazing refractory metals, particularly zirconium, hafnium, tungsten, vanadium, molybdenum, chromium, titanium, nickel, cobalt, as well as refractory compounds based on these metals, i.e., borides, nitrides, sulphides, phosphides, carbides and silicides, and also various refractory alloys, as well as articles based on the refractory oxides of beryllium and aluminum.

Known in the art is a method of brazing in which a brazing filler is placed between metal parts to be connected and these parts are heated together with the filler up to the melting point of the filler. The brazing filler melts down, wetting the surfaces of the parts being connected and, while filling the gaps therebetween, secures these surfaces together in the process of solidification.

This method is easily carried into effect but has a number of disadvantages.

The operating temperature of the brazed joint obtained by the above method is limited by the melting point of the brazing filler. In practice the operating temperature of the brazed joint constitutes at most 50–70 percent of the melting point of the filler.

The mechanical properties of the brazed joint are deteriorated by physico-chemical processes occurring in operation at high temperatures in a vacuum and aggressive media as in this case there occurs a sublimation of the materials of the brazing filler having a high vapor pressure in a vacuum and oxidation of the filler in an oxidizing medium.

Also, in the process of brazing the excessive filler runs from the zone of brazing and there occurs a chemical reaction of the filler with the other parts of the construction employing the materials being connected.

To prevent the running of the filler from the zone of brazing, grooves are usually made on the members to be connected, in which grooves the excess brazing filler is collected. Sometimes the surface of the member to be brazed is provided with a nonwetting coating to prevent chemical reaction of the brazing filler with the members being connected.

However, both the above methods are not suitable for refractory metals and compounds based thereon due to the fact that the mechanical working of these materials is very difficult, while the use of a lubricant, although limiting the running of the filler, does not prevent the oxidation and evaporation thereof in the process of long-term operation near the melting point of the filler. In practice the operating temperature of brazed joints is only 50–70 percent of the melting point of the filler. Thus at present, in the brazing of refractory metals, refractory alloys and compounds, the fillers which are employed are those which are themselves of a refractory nature or which form refractory compounds in the process of brazing, while chemically interacting with portions of the articles being brazed. Using such prior art methods, it is impossible to braze articles of materials having different coefficients of linear expansion, as is the case when joining borides with carbides or metal ceramic articles based on refractory oxides of beryllium or aluminum.

SUMMARY OF THE INVENTION

An object of the present invention is to provide a method of brazing, in which it is possible to separate the brazing filler from the surrounding space to obtain an article capable of operating at high temperatures over a long period of time under conditions of high vacuum and aggressive media.

The method is proposed for brazing refractory metals and compounds based thereon in which a brazing filler is placed between the members to be connected, the latter being heated together with the filler to the melting point of the filler. According to the invention, the filler is placed into a hermetically sealed envelope of a material whose melting point is higher than the brazing temperature, in which case the envelope is secured to both members to be connected by means of a diffusion welding at a temperature below the brazing temperature.

In the embodiment of the invention the material of the envelope consists of melts and compounds based thereon.

Owing to the present invention the operating temperature of the brazed joint is increased up to the melting temperature of the filler, in which case the operating temperature range of the brazed articles is considerably increased.

The tight sealing of the brazing filler according to the proposed method of brazing sharply reduces the processes of oxidation and sublimation of the filler under conditions of high vacuum and aggressive media at elevated temperatures and this makes it possible to preserve the required mechanical properties of the connected members.

The provision of a hermetically sealed envelope around the filler eliminates the running of the filler both in the process of brazing and in the process of operation of the brazed joint and this also makes it possible to maintain the strength of the joints.

A brazed joint made by the present method is capable of retaining its mechanical strength even after a multiple temperature cycling operation.

BRIEF DESCRIPTION OF THE DRAWINGS

Other objects and advantages of the invention will be apparent from the following detailed description of the method of brazing, reference being made to the accompanying drawing illustrating a diagram of disposition of the members being connected in the process of brazing by the proposed method.

DESCRIPTION OF THE PREFERRED EMBODIMENTS

To effect the process of brazing, the components to be joined were composed of a molybdenum plate 1 and a tungsten carbide plate 2.

Placed between these parts 1 and 2 was a brazing filler 3 of a copper foil. The brazing filler 3 was placed into an envelope 4 made of a nickel foil embracing the filler about the perimeter.

The parts 1 and 2 to be connected, the filler 3 and the protective envelope 4 are fixed by means of pressing, thereafter a diffusion welding of the protective envelope 4 with the parts 1 and 2 is effected.

The process of diffusion welding of the tungsten carbide-nickel-molybdenum is effected in a vacuum of $10^{-4}$ mm mercury column at a temperature not exceeding 1000°C for 15 min and under a pressure of 50 kg/cm².

The welded surfaces occupy not more than 10–15% of the area of the surfaces in contact.

The process of brazing is then effected by means of heating the members to the melting point of the filler within the formed hermetically sealed space.

The process of brazing the tungsten carbide and molybdenum by a copper filler was effected in a vacuum at a temperature of 1100°–1150°C for 5 to 10 minutes under a pressure of up to 10 kg/cm².

The article produced by the proposed method of brazing was subjected to ten to fifteen periods of thermocycling in a vacuum of $10^{-4}$ mm mercury column at a rate of heating-cooling up to 100°C per minute and to a prolonged calcination in a vacuum for 500 hours and in the open air for 5–10 hours.

It has been found after the test that the place of contact of the connected parts 1 and 2 with the brazing filler 3 and with the envelope 4 remains strong and hermetically sealed, while the brittle metallides formed about the perimeter in the process of calcination do not change the structure of the connected members and the electric resistance of the produced joint.

Prior to the calcination $R_{cont.} = 10$ microohm · cm²

After the calcination $R_{cont.} = 10$ microohm · cm²

The proposed method is particularly suitable for conducting the process of brazing such refractory metals as titanium, nickel, cobalt, chromium, molybdenum, vanadium, hafnium, tungsten and compounds based on these metals, i.e., borides, sulphides, phosphides, carbides, silicides, nitrides.

The filler may be composed of such metals as copper while the envelope may be made of niobium, nickel, or aluminum oxide.

The method of the present invention has wide application and may be employed in brazing homogeneous as well as heterogeneous refractory materials. The present method allows brazing to be carried out with a solid filler material possessing highly plastic properties both before and after brazing, thus making it possible to braze articles having different coefficients of linear expansion.

It is claimed:

1. A method of brazing articles of refractory metals, refractory alloys and compounds based on these metals which comprises:
   a. placing a filler into an envelope of a material whose melting point is higher than that of the filler, the envelope being located along the periphery of the filler;
   b. placing the envelope and the filler between the articles to be connected so that the envelope and the surfaces of the articles form a closed cavity enclosing the filler;
   c. subjecting the articles and the envelope to diffusion welding at a temperature below the melting point of the filler, in order to hermetically seal the closed cavity enclosing the filler; and then
   d. heating the articles being connected together with the filler and the envelope to the melting point of the filler for melting the filler and connecting the filler with the articles.

2. The method of claim 1 wherein the envelope material comprises metals and compounds based on these metals.

3. The method of claim 2 wherein the envelope material is selected from the group consisting of niobium, nickel and aluminum oxide.

4. The method of claim 1 wherein the filler comprises copper.

* * * * *